July 22, 1969  R. H. TYLER  3,457,367
OSCILLATORY SCANNING CAMERA
Filed June 13, 1966  2 Sheets-Sheet 1
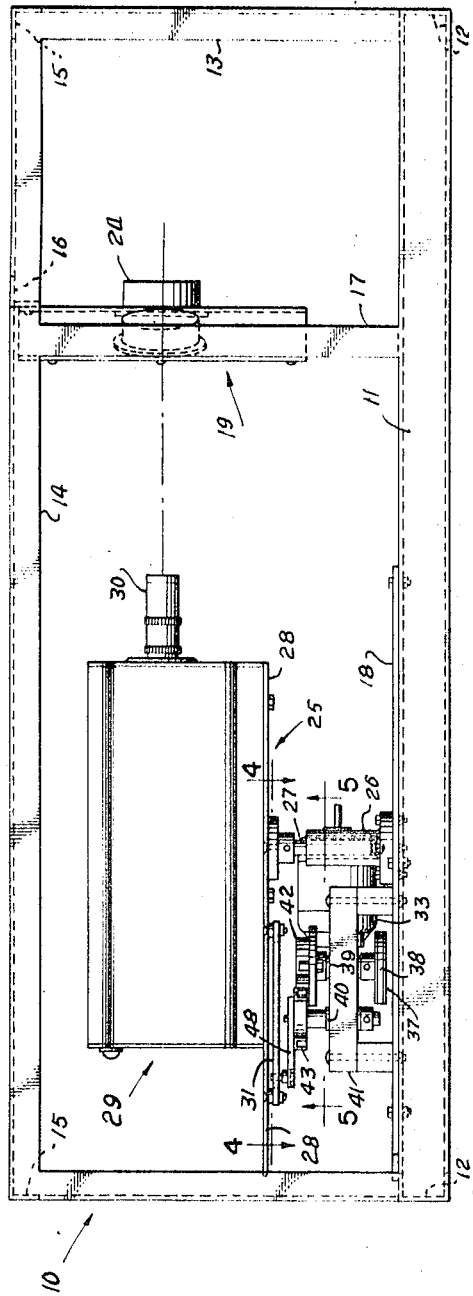
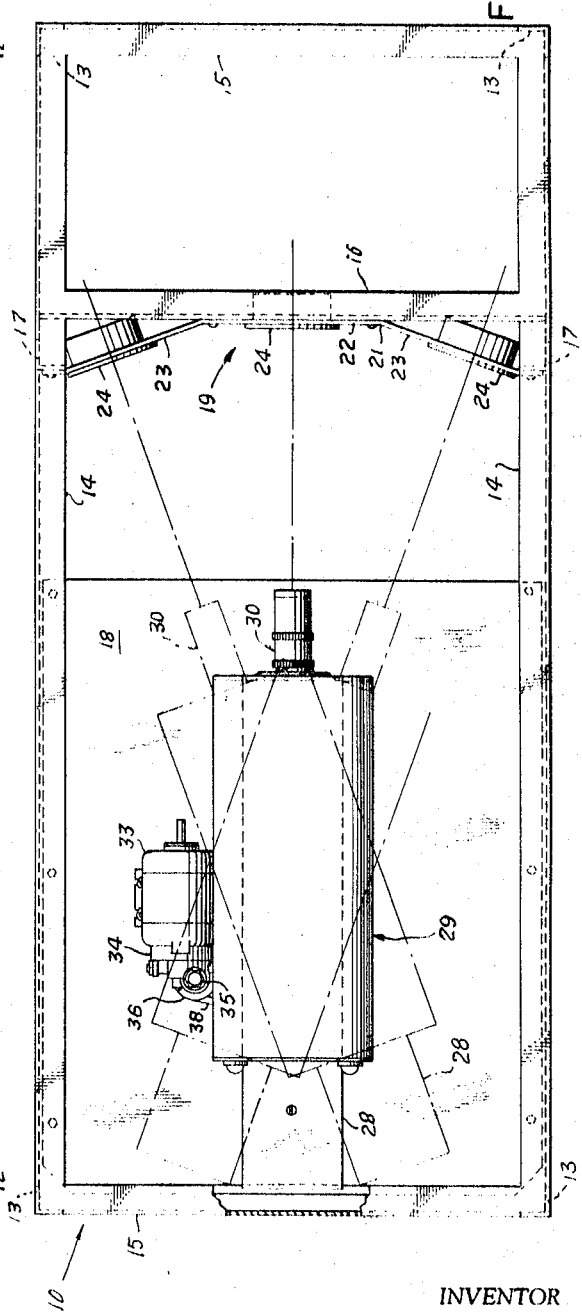
INVENTOR
Roy Hurshel Tyler
BY *Cecil L. Wood*
ATTORNEY July 22, 1969  R. H. TYLER  3,457,367
OSCILLATORY SCANNING CAMERA
Filed June 13, 1966  2 Sheets-Sheet 2

INVENTOR
Roy Hurshel Tyler

BY

ATTORNEY 3,457,367
OSCILLATORY SCANNING CAMERA
Roy Hurshel Tyler, Dallas, Tex., assignor of fifty percent to J. R. Tozer, Jr., Dallas, Tex.
Filed June 13, 1966, Ser. No. 557,001
Int. Cl. H01j 29/86, 29/89
U.S. Cl. 178—7.81   1 Claim

ABSTRACT OF THE DISCLOSURE

A device for televising visual information, such as weather conditions, including temperature changes, wind direction and velocity, atmospheric pressure, and other data, by use of a camera automatically oscillated to focus on a series of spaced dials or gauges arranged horizontally in an arcuate pattern, the camera having means for intermittent detention at predetermined time intervals while focusing on each dial or gauge.

Summary

This invention relates to a remote visual information monitoring system, and more particularly it relates to a system for televising or photographically recording the activity in a prescribed area.

The invention is related to the inventions shown and described in my Patent No. 3,226,476, dated Dec. 28, 1965, and in my copending application, Ser. No. 557,000, filed June 13, 1966.

My invention has important applications in many fields, but in particular it solves the problem of providing a visual reproduction of an array of constantly varying instrumentation, dials, or gauges supplying related portions of information to a large number of observers at remote viewing stations.

A long felt need for my invention arose in connection with the problem of supplying weather data and other information simultaneously to a large number of persons in certain widely spread localities by means of regular or closed circuit television channels and by a system that required a minimum number of personnel.

To solve this problem I devised a system wherein the vital weather data is measured and displayed on a series of dials capable of indicating current temperature, atmospheric pressure, wind velocity, and other variable factors. The problem then arose of providing a means whereby these dials could be automatically scanned at intervals by a television transmitter so that they can be viewed and visually monitored on a larger number of remote receivers.

In summarizing the foregoing, it is therefore a general object of my invention to provide a system for visually monitoring a prescribed area such as one occupied by an array of instruments with either photographic or television camera equipment so that the instruments or the subject matter recorded can be easily viewed at remote stations.

A particular problem in visually monitoring a plurality of dials or gauges was that of reproducing a picture wherein each dial appears large enough on the viewing screen and is clear and distinct. Assembling a plurality of dials together and including them within a single picture by means of a wide angle lens is unsatisfactory because each individual dial becomes too small and is thus difficult to read on the television screen.

My invention solves this problem by providing an apparatus wherein the dials or gauges are mounted in a fixed spaced apart relationship, in an arcuate pattern, on a curved or polygonal upright panel in which the several dials or gauges are arranged in an arc facing a common center, and in which the panel is connected to and positioned relative to a swinging camera support including a movable platform having a camera thereon, and having means for oscillating it about a vertical axis, within predetermined limits and at a controllable rate, to produce an oscillating motion of the camera lens in an arcuate path coinciding with the arcuate pattern.

An important feature of the invention is that the means for oscillating the platform about a vertical axis includes an electric motor, and the oscillating movement of the platform is accomplished without having to stop and reverse the motor.

Another feature of the invention is that the oscillating movement of the platform about its vertical axis is intermittent, by stages, whereby the camera lens is caused to be focused on the dials or gauges successively, in rotation, for predetermined time intervals.

Another object of my invention is to provide a scanning device as described that can be automatically or manually controlled at a position located remotely from the apparatus and which can be operated either continuously or intermittently.

Another object of the invention is to provide a visual monitoring device, for scanning a prescribed area, that is economical in maintenance and operating cost as well as being unusually well adapted for ease and economy of production.

Yet another object of my invention is to provide an automatic self operating information transmission apparatus that is particularly compact and which can accommodate a number of information dials on an upright panel, as described, located at a proper viewing distance from the camera.

While the foregoing objects are paramount, other and lesser objects will become apparent as the description proceeds, when considered in connection with the appended drawings wherein:

FIGURE 1 is a side elevational view of a television scanning device embodying the invention.

FIGURE 2 is a top plan view thereof.

Figure 3:
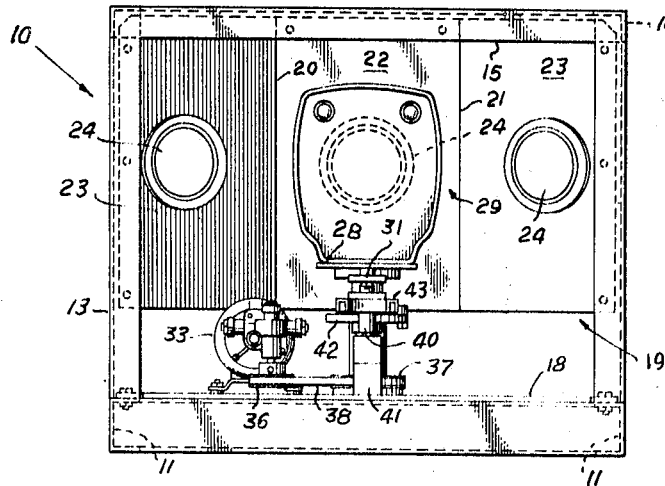
FIGURE 3 is an end elevational view.

Referring to the drawing, the television scanning device of the invention includes a box-shaped, generally rectangular open frame, designated generally by the numeral 10, having a base formed by a pair of elongated side rails 11 and a pair of end members 12, two pairs of corner posts 13, and a top formed by a pair of elongated side rails 14 and a pair of end members 15.

The side rails 11 and the end members 12 which form the base of the frame 10 are channel shaped in transverse section, while the corner posts 13, and the side rails 14 and the members 15 which form the top of the frame 10, are right angular in transverse section.

An instrument panel 19, which is arranged transversely of the frame 10, is connected at its top and sides to the cross member 16 and the upstanding members 17 whereby it is supported above the base of the frame 10. The instrument panel 19 is bent at obtuse angles intermediate its ends, as at 20, 21, to form a middle section 22 and a pair of side sections 23 which are arranged in a symmetrical, arcuate pattern facing a common center, in the direction of the end of the frame 10 opposite said one of its ends. The middle section 22 and the side sections 23 of the instrument panel 19 each have a dial or gauge 24 thereon.

A cross member 16, which is right angular in transverse section, extends horizontally between the side rails 14 forming the top of the frame 10, in spaced apart relation to one end of the frame 10, and a pair of upstanding members 17, which are also angular in transverse section, each extend vertically between one of the lower side rails 11 and the corresponding upper side rail 14, immediately adjacent the cross member 16. A deck plate 18 extends horizontally across the tops of the side rails 11 forming the base of the frame 10, beginning at the end thereof opposite said one of its ends.

A camera support as hereinafter described, indicated generally by the numeral 25, is mounted on the deck 18 intermediate the ends of the frame 10, in predetermined spaced apart relation to the instrument panel 19.

The camera support 25 includes an upstanding, generally cylindrical pedestal 26 having an upwardly extending shaft 27 arranged concentrically and coaxially relative thereto. The shaft 27 extends a short distance above the pedestal 26 and is rotatable axially relative thereto. A movable platform 28 is supported on the upper end of the shaft 27 for rotative adjustment about a vertical axis corresponding to the axis of the shaft 27.

A camera 29 is arranged upon the movable platform 28 with the lens thereof, indicated by the numeral 30, facing the instrument panel 19. The camera 29 is adapted to be oscillated, with the movable platform 28, about a vertical axis corresponding to the axis of the upwardly extending shaft 27 whereby a swinging, back and forth motion is imparted to the lens 30, in an arcuate path corresponding to the arcuate pattern of sections 22, 23 of the instrument panel 19 and the dials or gauges 24 thereon, and the lens 30 is caused to be focused on the several dials or gauges 24 successively, in rotation.

The invention further includes drive means as hereinafter described acting on the movable platform 28 to oscillate it about a vertical axis coinciding with the axis of the upwardly extending shaft 27.

The oscillating movement of the movable platform 28 is intermittent, by stages, whereby the lens 30 of the camera 29 is caused to be focused on the several dials or gauges 24 successively, in rotation, for predetermined time intervals.

The movable platform 28 extends rearwardly of the camera 29, beyond the end of the camera 29 opposite its lens 30, and has an elongated plate 31 connected to its under side, in spaced apart relation thereto. The elongated plate 31 is aligned with the longitudinal axis of the movable platform and with the lens 30 of the camera 29, and is positioned rearwardly of the pedestal 26, on the side thereof opposite the lens 30, in spaced apart relation thereto. The elongated plate 31 has a longitudinal slot 32 therein for use as hereinafter described, the slot 32 being positioned centrally of the plate 31 and having a length approaching the length of the plate 31.

An electric motor 33, which is mounted on the deck plate 18 below the movable platform 28, and in laterally spaced relation thereto, is drivingly connected, through speed reducing gears 34, to a first drive shaft 35 whereby said drive shaft, which extends vertically, is adapted to be driven by the motor 33.

The first drive shaft 35 is drivingly connected, by a pair of pulleys 36, 37 and a connecting belt 38, to a second drive shaft 39, which with a third drive shaft 40 also extends vertically and is rotatably supported on an upstanding bracket 41 mounted on the deck plate 18.

A first drive wheel 42 on the second drive shaft 39 coacts with a second, relatively smaller drive wheel 43 on the third drive shaft 40 to turn the third drive shaft 40 as hereinafter described in response to rotation of the first drive shaft 39.

The drive wheels 42, 43 have mutually engaging means thereon as hereinafter described whereby the second drive wheel 43, which with the first drive wheel 42 comprises a Geneva movement, is rotated intermittently, in accordance with a predetermined time cycle, in response to rotation of the first drive wheel 42.

Figure 4:
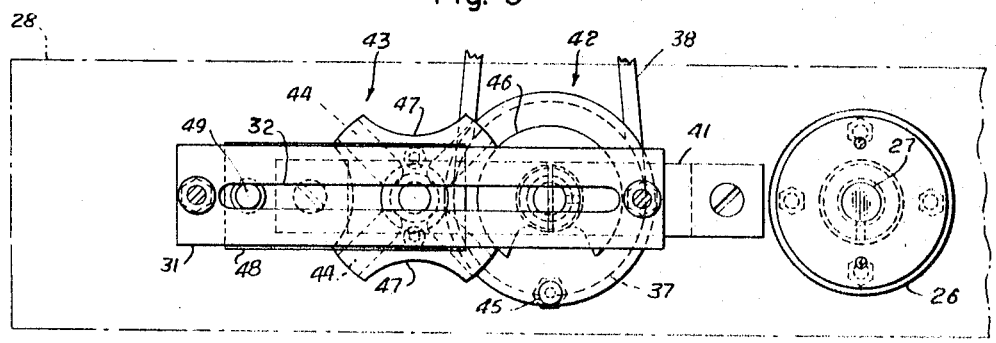
FIGURE 4 is a fragmentary sectional elevational view on an enlarged scale taken on the line 4—4 of FIGURE 1.
Figure 5:
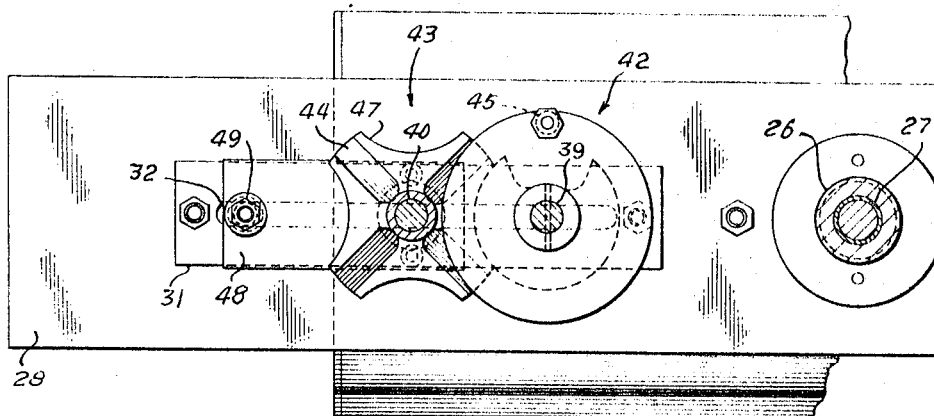
FIGURE 5 is a fragmentary sectional elevational view on an enlarged scale taken on the line 5—5 of FIGURE 1.

As shown best in FIGURES 4 and 5, the second drive wheel 43 is generally square and has radially extending grooves 44 in one side thereof, at its four corners, for selective engagement by a roller 45 on one side of the first drive wheel 42, eccentrically thereof, whereby the second drive wheel 43 is turned one-fourth of a revolution for each complete revolution of the first drive wheel 42.

The first drive wheel 42 has an arcuate boss 46 thereon, on the same side as the eccentric roller 45 but spaced radially inwardly and circumferentially relative thereto, for sliding engagement with similarly curved depressions 47 in the second drive wheel 43, between the radially extending grooves 44, as the first drive wheel 42 is rotated relative to the second drive wheel 43, as the roller 45 is disengaged from the grooves 44, and for abutment against the opposing surfaces of the second drive wheel 43 to secure it against rotation.

A crank arm 48 on the third drive shaft 40, which extends laterally outwardly beyond the second drive wheel 43, has a pin 49 on its outer end for sliding engagement with the longitudinal slot 32 in the plate 31 whereby the movable platform 28 and the camera 29 are oscillated about a vertical axis as described, intermittently, in accordance with a predetermined time cycle, and the lens 30 is caused to be focused on the several dials or gauges 24 successively, in rotation, for predetermined time intervals, by the action of the motor 33.

The invention may be modified within certain limitations by persons skilled in the art without departing from the spirit and intent thereof or the scope of the appended claim.

What is claimed is:
1. In a television scanning device, the combination of an elongated frame, an instrument panel arranged transversely of one end of the frame and having a plurality of laterally spaced dials or gauges arranged thereon in an arcuate pattern facing a common center toward the opposite end of the frame, a camera support on the frame and spaced from said panel, said camera support including a movable platform having means supporting it for rotative adjustment about a vertical axis, a camera arranged on said platform with its lens facing said instrument panel, and drive means, including a Geneva movement, acting on said movable platform to oscillate said platform and said camera about said vertical axis in an arcuate path corresponding to said arcuate pattern, whereby the oscillation of said platform and said camera is intermittent, in accordance with a predetermined time cycle, and said lens is caused to be focused on said dials or gauges successively, in rotation, for predetermined time intervals.

References Cited
UNITED STATES PATENTS

| | | | |
|---|---|---|---|
| 3,236,116 | 2/1966 | Hafferkamp | 74—346 |
| 3,239,601 | 3/1966 | Keys | 178—6 |
| 3,264,968 | 8/1966 | De Barr | 95—86 |

ROBERT L. GRIFFIN, Primary Examiner

JOSEPH A. ORSINO, Jr., Assistant Examiner

U.S. Cl. X.R.

178—7.92